United States Patent
Furuse et al.

(10) Patent No.: US 6,897,172 B2
(45) Date of Patent: May 24, 2005

(54) DIELECTRIC CERAMIC COMPOSITION AND DIELECTRIC CERAMICS

(75) Inventors: Tatsuji Furuse, Kagoshima (JP); Seiichiro Hirahara, Kagoshima (JP); Shuji Nakazawa, Kagoshima (JP); Yasushi Ode, Kagoshima (JP); Tomoyuki Kojima, Kagoshima (JP); Fumiaki Sekine, Shiga (JP); Hiroshi Makino, Kagoshima (JP); Manabu Yonekura, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 45 days.

(21) Appl. No.: 10/350,901

(22) Filed: Jan. 23, 2003

(65) Prior Publication Data

US 2004/0009863 A1 Jan. 15, 2004

(30) Foreign Application Priority Data

Jan. 28, 2002 (JP) ........................................ 2002-019016
Apr. 24, 2002 (JP) ........................................ 2002-123057
May 13, 2002 (JP) ........................................ 2002-137578

(51) Int. Cl.$^7$ ........................ C04B 35/465; C03C 10/04; C03C 14/00
(52) U.S. Cl. .............................. 501/32; 501/5; 501/136
(58) Field of Search ................................. 501/5, 32, 136

(56) References Cited

U.S. PATENT DOCUMENTS

| 3,787,219 A | * | 1/1974 | Amin ........................... 501/32 |
| 6,232,251 B1 | | 5/2001 | Terashi et al. |
| 6,447,888 B2 | * | 9/2002 | Suzuki et al. ................ 428/210 |
| 6,660,670 B2 | * | 12/2003 | Terashi et al. .................. 501/5 |
| 2001/0029228 A1 | * | 10/2001 | Terashi ......................... 501/32 |

FOREIGN PATENT DOCUMENTS

| JP | 6-279104 | * 10/1994 |
| JP | 6-326429 | * 11/1994 |
| JP | 2001-348268 | 12/2001 |

* cited by examiner

*Primary Examiner*—Karl Group
(74) *Attorney, Agent, or Firm*—Hogan & Hartson LLP

(57) ABSTRACT

The present invention provides a dielectric ceramic composition comprising: 30 to 90% by weight of a crystallized glass powder capable of depositing a diopside crystal, 1 to 40% by weight of a calcium titanate powder, a strontium titanate powder or a mixed powder thereof, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$, and a dielectric ceramics obtained by firing the same.

24 Claims, 1 Drawing Sheet

DIELECTRIC CERAMIC COMPOSITION AND DIELECTRIC CERAMICS

FIELD OF THE INVENTION

The present invention relates to a dielectric ceramic composition and a dielectric ceramics and, more particularly, to a dielectric ceramic composition and dielectric ceramics, which exhibits a relative dielectric constant of 8 to 22 in high-frequency regions such as microwaves and millimeter waves, and also have high mechanical strength and high-accuracy temperature coefficient as compared with conventional glass ceramics.

BACKGROUND OF THE INVENTION

Heretofore, dielectric ceramics have been widely used in dielectric resonators, dielectric substrate materials for MIC and waveguides that are used in high-frequency applications such as microwave and millimeter waves. With the recent development and spread of mobile communication including portable telephone, demand for dielectric ceramics as materials for electronic circuit boards and electronic parts has been increasing.

As a dielectric ceramic composition for electronic circuit boards and electronic parts, there have been developed so-called glass ceramics made of glass, which can be fired together with a high-conductive metal such as silver or copper, or a composite material of glass and ceramics.

For example, Unexamined Patent Publication (Kokai) No. 2001-348268 describes a dielectric ceramic composition comprising $SiO_2$, $CaO$, $MgO$, $B_2O_3$ and $Al_2O_3$ which can be fired at the temperature of 1000° C. or lower and can be used in high-frequency parts.

Although the dielectric ceramic composition described in Unexamined Patent Publication (Kokai) No. 2001-348268 exhibits low dielectric loss, a temperature coefficient of electrostatic capacity increases because the dielectric ceramics has a large temperature coefficient of resonant frequency, and thus desired electric conductive characteristic can not be obtained according to service environment. Because of a low mechanical strength, cracking is likely to be caused by impact of an electronic equipment using the dielectric ceramics upon dropping.

SUMMARY OF THE INVENTION

A main object of the present invention is to provide a high-strength dielectric ceramic composition and a high-strength dielectric ceramics, which are suited for use in high-frequency parts and can control high-accuracy temperature characteristics.

Another object of the present invention is to provide a dielectric ceramic composition and a dielectric ceramics, which can prevent discoloration of a substrate upon firing together with a conductor or to color the substrate, thereby making it possible to reduce a rate of poor appearance.

The present invention has been completed based on such a fining that temperature characteristics of the resonant frequency can be improved and control of the desired dielectric constant and high strength can be achieved by using a dielectric ceramic composition comprising crystallized glass capable of depositing a diopside crystal, calcium titanate and/or strontium titanate and at least one kind selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$. The dielectric ceramic composition of the present invention comprises at least a crystallized glass powder capable of depositing a diopside crystal and a calcium titanate and/or a powdered strontium titanate.

Particularly, the dielectric ceramic composition of the present invention comprises:
(1) 30 to 90% by weight of a crystallized glass powder capable of depositing a diopside crystal,
(2) 1 to 40% by weight of a calcium titanate powder, a strontium titanate powder or a mixed powder, and
(3) 0 to 60% by weight of at least one kind selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

By using the mixture of various powders with such a composition, temperature characteristics of the resonant frequency of the dielectric ceramics formed after firing can be improved and control of the desired dielectric constant and high strength can be achieved.

Also it is preferred that a crystallized glass powder capable of depositing a diopside crystal, a calcium titanate powder, a strontium titanate powder, or a mixed powder of a calcium titanate powder and a strontium titanate powder used in the dielectric ceramic composition have a mean particle size of 3 μm or smaller in order to enhance the mechanical strength of the dielectric ceramics and to improve dielectric characteristics such as temperature coefficient of the resonant frequency.

The other dielectric ceramic composition of the present invention comprises:

[I] 100 parts by weight of a mixed powder comprising (1) 30 to 90% by weight of a crystallized glass powder capable of depositing a diopside crystal, (2) 1 to 40% by weight of a calcium titanate powder, a strontium titanate powder or a mixed powder thereof and (3) 0 to 60% by weight of at least one kind selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$, and
[II] 0.1 to 2.0 parts by weight of at least one kind of a powder (color tone modifier) selected from the group consisting of $Fe_2O_3$, $Cr_2O_3$, $ZnO$, $CuO$, $Ag_2O$, $Co_3O_4$, $MnO_2$, $CeO_2$ and $R_2O_3$ (R represents a rare earth element).

By using the mixture of various powders with such a composition, temperature characteristics of the resonant frequency of the dielectric ceramics formed after firing can be improved and control of the desired dielectric constant and high strength can be achieved. Furthermore, it becomes possible to prevent discoloration of a substrate upon firing together with a conductor or to color the substrate, thereby making it possible to reduce a rate of poor appearance.

The dielectric ceramics of the present invention can be obtained by firing a preform (a green body) of a mixture of the dielectric ceramic composition at a temperature within a range from 850 to 1050° C., and a relative dielectric constant ∈r is within a range from 8 to 22 and a three-point bending strength is 250 MPa or larger, and a temperature coefficient of the resonant frequency is $0\pm60\times10^{-6}/°$ C.

Therefore, in dielectric substrate materials for MIC and electronic parts, in case of firing together with a conductor comprising Ag or Cu as a main component, the occurrence of warp and strain can be prevented and it becomes possible to design high-functional high-frequency circuit parts. Furthermore, when using dielectric ceramic composition containing the color tone modifier added therein, it becomes possible to prevent discoloration caused by a reducing action due to the conductor or to color the substrate.

In the dielectric ceramics of the present invention, the temperature coefficient of the electrostatic capacity is preferably 0±150×10⁻⁶/° C. Whereby, variation in the electrostatic capacity due to change in the temperature can be suppressed and temperature characteristics of the dielectric ceramics can be controlled with high accuracy.

Furthermore, in the ceramics after firing, at least diopside and/or a diopside solid solution and calcium titanate and/or strontium titanate preferably co-exist as a crystal phase. As described above, by allowing the crystal phase capable of changing the strength and the temperature coefficient of the dielectric ceramics to co-exist in the dielectric ceramics, the mechanical strength of the dielectric ceramics can be enhanced and also the relative dielectric constant and the temperature coefficient can be easily controlled.

The ceramics after firing preferably exhibits a thermal expansion coefficient as measured at room temperature to 400° C. of $8 \times 10^{-6}$/° C. or higher. Whereby, the thermal expansion coefficient of the dielectric ceramics can be made to be closer to the thermal expansion coefficient of a glass epoxy resin used in a mother board and thus the mounting reliability to thermal shock can be improved.

DETAILED DESCRIPTION OF THE INVENTION

Figure 1:
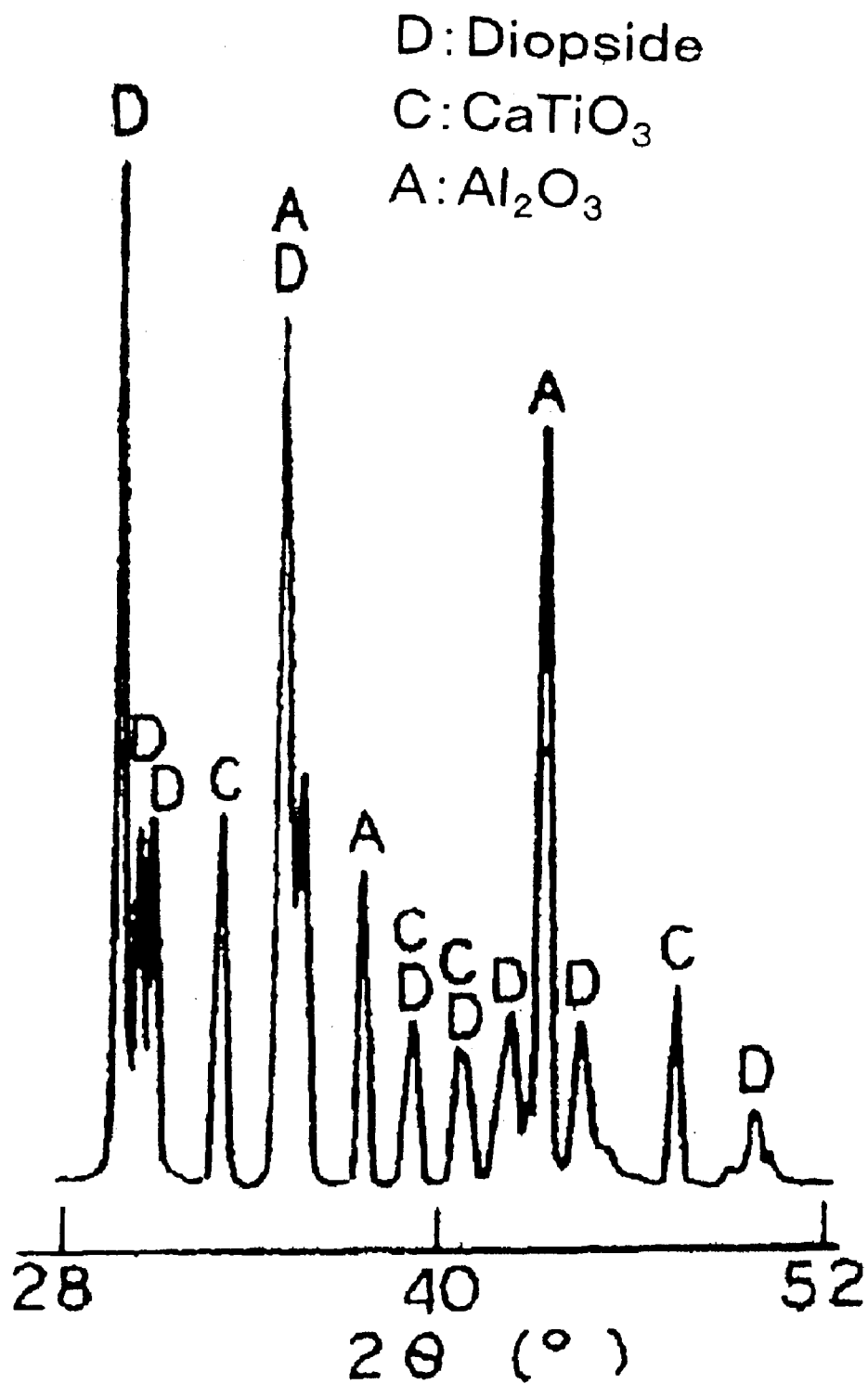
FIG. 1 is a graph showing a powder X-ray diffraction pattern of a sample No. 1 according to Example 1 as the dielectric ceramics of the present invention.

It is important that the dielectric ceramic composition of the present invention contains a crystallized glass powder capable of depositing a diopside crystal and a calcium titanate powder, a strontium titanate powder or a mixed powder thereof and also contains at least one kind of a powder (filler component) selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

The diopside crystal is preferably used because of large relative dielectric constant, small dielectric loss and high strength in high frequency.

Calcium titanate and/or strontium titanate are used to compensate the temperature coefficient of the resonant frequency of the diopside crystal deposited in the dielectric ceramic composition. In case of using the diopside crystal alone, the temperature coefficient of the resonant frequency exhibits negative characteristics, while in case of using calcium titanate and/or strontium titanate alone, the temperature coefficient of the resonant frequency exhibits positive characteristics. Therefore, the diopside crystal is preferably used to control the temperature coefficient of the resonant frequency.

The filler components such as $Al_2O_3$ are preferably used in combination to improve the mechanical strength of the dielectric ceramics and to compensate temperature characteristics to the amount of calcium titanate.

To constitute the dielectric ceramic composition of the present invention, it is important that the dielectric ceramic composition comprises 30 to 90% by weight of a crystallized glass powder capable of depositing a diopside crystal, 1 to 40% by weight of a calcium titanate powder and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

The amount of the crystallized glass powder capable of depositing a diopside crystal was defined within a range from 30 to 90% by weight by the following reason. That is, the amount of the crystallized glass powder is within the above range, a high-density dielectric ceramics can be formed at a temperature within a range from 850 to 1050° C. and it becomes possible to fire together with a conductor comprising Ag or Cu as a main component. When the amount of the crystallized glass powder is smaller than 30% by weight, the composition is not sintered at a temperature lower than 1050° C. and it becomes impossible to fire together with the conductor comprising Ag or Cu as a main component. On the other hand, when the amount exceeds 90% by weight, the mechanical strength is lowered and it becomes difficult to retain the shape in case glass is softened during the firing, resulting in poor dimensional accuracy of the wiring substrate. Therefore, the amount of the crystallized glass powder is more preferably within a range from 40 to 80% by weight in order to maintain sinterability, high strength and high dimensional accuracy.

The crystallized glass powder capable of depositing a diopside crystal preferably has a composition of 30 to 55% by weight of $SiO_2$, 10 to 35% by weight of MgO and 24 to 40% by weight of CaO. $Al_2O_3$ may be contained alone or together with ZnO in the crystallized glass powder. It is desirable that the amount of $Al_2O_3$ is 4.5 to 15% by weight.

At least one kind selected from the group consisting of hardystonite, celsian, cordierite, anorthite, gahnite, willemite, spinel and mullite is preferably deposited from the glass powder, in addition to diopside, because high strength can be achieved.

The amount of the calcium titanate powder was defined within a range from 1 to 40% by weight by the following reason. That is, the diopside crystal, which has the temperature coefficient of the resonant frequency τf of $-63 \times 10^{-6}$/° C. and exhibits negative characteristics, and the calcium titanate powder, which exhibits the temperature coefficient of the resonant frequency τf of $840 \times 10^{-6}$/° C. at a temperature within a range from 25 to 85° C., co-exist in the dielectric ceramics and both powders can compensate the temperature coefficient of the resonant frequency and control it within a range of $0 \pm 60 \times 10^{-6}$/° C.

When the amount of the calcium titanate powder is smaller than 1% by weight, it becomes difficult to improve the relative dielectric constant of the dielectric ceramics and to control the temperature coefficient of the resonant frequency within a range of $0 \pm 60 \times 10^{-6}$/° C. On the other hand, when the amount exceeds 40% by weight, the temperature coefficient of the resonant frequency increases to the positive side and it becomes difficult in order to control the temperature coefficient of the resonant frequency within a range of $0 \pm 60 \times 10^{-6}$/° C. while maintaining the sinterability. Therefore, the amount of the calcium titanate powder is more preferably within a range from 3 to 30% by weight to control the temperature with high accuracy. As used herein, control of the temperature coefficient of the resonant frequency within a range of $0 \pm 60 \times 10^{-6}$/° C. means that the absolute value is $60 \times 10^{-6}$/° C. or smaller.

The amount of the strontium titanate powder used in place of the calcium titanate powder was defined within a range from 1 to 40% by weight by the following reason. That is, the diopside crystal, which has the temperature coefficient of the resonant frequency τf of $-63 \times 10^{-6}$/° C. and exhibits negative characteristics, and the strontium titanate powder, which exhibits the temperature coefficient of the resonant frequency τf of $1670 \times 10^{-6}$/° C. at a temperature within a range from 25 to 85° C., co-exist in the dielectric ceramics and both powders can compensate the temperature coefficient of the resonant frequency and control it within a range of $0\pm60\times10^{-6}/°$ C.

When the amount of the strontium titanate powder is smaller than 1% by weight, it becomes difficult to improve the relative dielectric constant of the dielectric ceramics and to control the temperature coefficient of the resonant frequency within a range of $0\pm60\times10^{-6}/°$ C. On the other hand, when the amount exceeds 40% by weight, the temperature coefficient of the resonant frequency increases to the positive side and it becomes difficult in order to control the temperature coefficient of the resonant frequency within a range of $0\pm60\times10^{-6}/°$ C. while maintaining the sinterability. Therefore, the amount of the strontium titanate powder is more preferably within a range from 3 to 30% by weight to control the temperature with high accuracy. As used herein, control of the temperature coefficient of the resonant frequency within a range of $0\pm60\times10^{-6}/°$ C. means that the absolute value is $60\times10^{-6}/°$ C. or smaller.

When using the mixed powder of calcium titanate and strontium titanate in place of calcium titanate or strontium titanate, The amount of the mixed powder was defined within a range from 1 to 40% by weight by the following reason. That is, the diopside crystal, which has the temperature coefficient of the resonant frequency $\tau f$ of $-63\times10^{-6}/°$ C. and exhibits negative characteristics, and the mixed powder in the state wherein two phase of calcium titanate and strontium titanate co-exist, which exhibits the temperature coefficient of the resonant frequency $\tau f$ within a range from $840\times10^{-6}$ to $1670\times10^{-6}/°$ C. at a temperature within a range from 25 to 85° C., co-exist in the dielectric ceramics and both powders can compensate the temperature coefficient of the resonant frequency and control it within a range of $0\pm60\times10^{-6}/°$ C.

When the amount of the mixed powder of calcium titanate and strontium titanate is smaller than 1% by weight, it becomes difficult to improve the relative dielectric constant of the dielectric ceramics and to control the temperature coefficient of the resonant frequency within a range of $0\pm60\times10^{-6}/°$ C. On the other hand, when the amount exceeds 40% by weight, the temperature coefficient of the resonant frequency increases to the positive side and it becomes difficult to control the temperature coefficient of the resonant frequency within a range of $0\pm60\times10^{-6}/°$ C. while maintaining the sinterability. Therefore, the amount of the mixed powder of calcium titanate and strontium titanate is more preferably within a range from 3 to 30% by weight in order to control the temperature with high accuracy.

As used herein, control of the temperature coefficient of the resonant frequency within a range of $0\pm60\times10^{-6}/°$ C. means that the absolute value is $60\times10^{-6}/°$ C. or smaller.

The amount of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$ as the filler component was defined within a range from 0 to 60% by weight by the following reason. That is, when the amount exceeds 60% by weight, it becomes impossible to sinter at 1050° C. or lower. Particularly, the amount is preferably 50% by weight or smaller in view of the sinterability. As the filler component used herein, a combination of calcium titanate and/or strontium titanate wherein the temperature coefficient of the resonant frequency exhibits positive characteristics, $TiO_2$ and $BaTi_4O_9$ wherein the temperature coefficient exhibits positive characteristics, and $Al_2O_3$, $ZrO_2$, $MgTiO_3$, $La_2Ti_2O_7$, $Nd_2Ti_2O_7$, $Ca_2Nb_2O_7$, $SrZrO_3$ and $CaZrO_3$ wherein the temperature coefficient of the resonant frequency exhibits negative characteristics is preferably selected and prepared to control the temperature coefficient of the resonant frequency to nearly zero. The amount of the filler component is more preferably within a range from 0.5 to 30% by weight.

In addition to the above compounds, the composition may contain V, Cr, Mo, W, Mn, Co, Ni, Cu, Ag, Ru, Cd and oxides thereof in the amount of 10% by weight or smaller as far as the strength is maintained and warp or strain of the substrate does not occur when fired together with the conductor.

The mean particle size of the powder, which serves as the filler component, is preferably within a range from 1 to 3.5 $\mu$m to control the sinterability and high strength of the ceramics and the temperature coefficient of the resonant frequency, and more preferably from 1.2 to 3 $\mu$m in order to improve the dispersibility to the crystallized glass powder capable of depositing a diopside crystal, the calcium titanate powder or the strontium titanate powder.

The method of producing a dielectric ceramics using the composition of the present invention will now be described. First, a glass powder having a mean particle size of 1 to 3 $\mu$m, a calcium titanate powder and/or a strontium titanate powder, each having a mean particle size of 1 to 3 $\mu$m, and at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$ as a filler component are prepared.

The mean particle size of the crystallized glass powder capable of depositing a diopside crystal, the calcium titanate powder and/or the strontium titanate powder is preferably 3 $\mu$m or smaller because a high-density dielectric ceramics can be obtained by firing at a temperature within a range from 850 to 1050° C., and more preferably within a range from 1.5 to 2.5 $\mu$m because compensation of the temperature coefficient of the resonant frequency and high strength can be achieved.

As the combination of the calcium titanate powder and/or the strontium titanate powder and the filler component, a combination of calcium titanate and/or strontium titanate wherein the temperature coefficient of the resonant frequency exhibits positive characteristics, a group ($TiO_2$ and $BaTi_4O_9$) wherein the temperature coefficient exhibits positive characteristics, and a group ($Al_2O_3$, $ZrO_2$, $MgTiO_3$, $La_2Ti_2O_7$, $Nd_2Ti_2O_7$, $Ca_2Nb_2O_7$, $SrZrO_3$ and $CaZrO_3$) wherein the temperature coefficient of the resonant frequency exhibits negative characteristics is preferably selected and prepared to control the temperature coefficient of the resonant frequency to nearly zero. Then, these raw powders are weighed and mixed in the above proportions in a ball mill using $ZrO_2$ balls to obtain a ground mixture having a particle size of 2.0 $\mu$m or smaller.

The resulting mixed powder is formed into a preform of a predetermined shape by various known forming methods such as press forming method, doctor blade method, injection molding method or tape forming method. Among these methods, a doctor blade method and a tape forming method are particularly preferred for formation of a laminate.

The resulting preform is fired in an oxidizing atmosphere such as air or a non-oxidizing atmosphere such as nitrogen at a temperature of 850 to 1050° C. for 0.5 to 2 hours to obtain dielectric ceramics.

Metal salts such as hydroxide, carbonate and nitrate which produce the oxides when fired may be used as raw powders. The dielectric ceramic composition of the present invention may include inevitable impurities such as Fe, Hf, Sn, Nb, Na and K as far as they do not exert any adverse influence on characteristics and sinterability.

It is particularly preferred that diopside and/or a diopside solid solution deposited from the glass powder and granular calcium titanate and/or strontium titanate co-exist in the dielectric ceramics in order to control the temperature characteristics. When the diopside crystal and calcium titanate and/or strontium titanate are remained in the ceramics, high strength can be imparted to the dielectric ceramics.

FIG. 1 is a graph showing a powder X-ray diffraction pattern of an example of a dielectric ceramics obtained by using calcium titanate as the dielectric ceramic composition of the present invention and $Al_2O_3$ as the filler and firing the composition. As shown in FIG. 1, there exist clear X-ray diffraction peaks which indicate crystal phases of the diopside crystal, calcium titanate, and $Al_2O_3$ added as the filler component. As is apparent from this fact, the diopside crystal, calcium titanate and the $Al_2O_3$ component co-exist in the dielectric ceramics. The other heterogenous phase may co-exist as far as it is a crystal phase which does not exert a drastic influence on the strength and dielectric characteristics. As a result of observation using an electron microscope, granular $CaTiO_3$ and $Al_2O_3$ are uniformly dispersed.

When using the strontium titanate powder or a mixture of the calcium titanate powder and the strontium titanate powder as the filler in place of the calcium titanate powder, the same tendency is recognized.

In the dielectric ceramics of the present invention with the above constitution, Er can vary within a range from 8 to 22, the three-point bending strength of the ceramics can be controlled to 250 MPa or larger, the temperature coefficient of the resonant frequency can be controlled to $0\pm60\times10^{-6}/°$ C., particularly, $0\pm40\times10^{-6}/°$ C., and the temperature coefficient of the electrostatic capacity can be controlled to $0\pm150\times10^{-6}/°$ C., particularly $0\pm70\times10^{-6}/°$ C. Also the firing temperature can be controlled to a temperature within a range from 850 to 1050° C. which enables the composition to fire together with a conductor comprising Ag or Cu as a main component. Therefore, the occurrence of warp or strain can be suppressed even in case of firing together with the conductor.

In the dielectric ceramics of the present invention, the thermal expansion coefficient as measured at a temperature within a range from room temperature to 400° C. is preferably $8\times10^{-6}/°$ C. or larger, and more preferably within a range from $8.5\times10^{-6}$ to $9.8\times10^{-6}/°$ C.

To constitute the other dielectric ceramics of the present invention, 0.1 to 2.0 parts by weight of at least one kind of a powder (II) selected from the group consisting of $Fe_2O_3$, $Cr_2O_3$, ZnO, CuO, $Ag_2O$, $Co_3O_4$, $MnO_2$, $CeO_2$ and $R_2O_3$ (R represents a rare earth element) is further added to 100 parts by weight of a mixed powder (I) comprising 30 to 90% by weight of a crystallized glass powder capable of depositing a diopside crystal, 1 to 40% by weight in total of a calcium titanate powder and/or a strontium titanate powder and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

At least one kind of the powder (II) selected from the group consisting of $Fe_2O_3$, $Cr_2O_3$, ZnO, CuO, $Ag_2O$, $Co_3O_4$, $MnO_2$, $CeO_2$ and $R_2O_3$ (R represents a rare earth element) was added in the amount within a range from 0.1 to 2.0 parts by weight based on 100 parts by weight of the mixed powder (I) by the following reason. That is, these powders are added as the color tone modifier in order to suppress uneven coloring of the substrate by preventing discoloration of the diopside crystal phase due to a reducing action upon firing together with the conductor, or coloring the substrate while suppressing lowering and variation of the mechanical strength. When the amount exceeds 2.0 parts by weight, the mechanical strength is drastically lowered. On the other hand, when the amount is smaller than 0.1 parts by weight, the effect of preventing discoloration or coloring disappears. The amount is more preferably within a range from 0.1 to 1.0 parts by weight in order to prevent discoloration or to control the substrate by maintaining high mechanical strength. The particle size of these oxides is preferably 1.0 µm or smaller to exert the above effect more sufficiently.

In case of producing a dielectric ceramics using the dielectric ceramic composition of the present invention, first, a mixed powder comprising a diopside crystallized glass powder having a mean particle size of 2.0 µm, a calcium titanate powder and/or a strontium titanate powder, each having a mean particle size of 2.0 µm, and at least one kind of a powder selected from the group consisting of $Al_2O_3$, $TiO_2$, $ZrO_2$, $MgTiO_3$, $SrTiO_3$, $BaTi_4O_9$, $La_2Ti_2O_7$, $Nd_2Ti_2O_7$, $Ca_2Nb_2O_7$, $SrZrO_3$ and $CaZrO_3$ as a filler component and, furthermore, at least one kind of a powder selected from the group consisting of $Fe_2O_3$, $Cr_2O_3$, ZnO, CuO, $Ag_2O$, $Co_3O_4$, $MnO_2$, $CeO_2$ and $R_2O_3$ (R represents a rare earth element) as a color tone modifier are prepared. Then, the resulting powders are mixed in the above proportion, formed and then fired in the same manner as described above to obtain a dielectric ceramics of the present invention.

EXAMPLES

Example 1

First, the following glass frits A and B were used as a glass frit which is a crystallized glass powder capable of depositing a diopside crystal, having a mean particle size of 2 µm.

Glass frit A: 45 wt % $SiO_2$-25 wt % CaO-15 wt % MgO-10 wt % ZnO-5 wt % $Al_2O_3$ Glass frit B: 49 wt % $SiO_2$-28 wt % CaO-18 wt % MgO-5 wt % $Al_2O_3$ As a filler, a $CaTiO_3$ powder having a mean particle size of 2 µm and purity of 99% or higher and $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$ powders each having a mean particle size of 2 µm were used. These respective components were weighed and mixed with water in proportions shown in Table 1 in wet process for 20 hours in a ball mill using $ZrO_2$ balls to obtain a ground mixture having a particle size of 1.5 µm or smaller.

As Comparative Example, a crystallized glass powder incapable of depositing a diopside crystal (glass frit C: 50 wt % of $SiO_2$-40 wt % of BaO-10 wt % of $Al_2O_3$) was used.

The ground mixture was formed into a preform of cylindrical shape in size of 5 mm×4 mm×50 mm as a sample for evaluation of a bending strength under a pressure of 100 MPa, fired under the conditions of a maximum temperature shown in Table 1 for one hour to obtain a sample in size of 4 mm×3 mm×40 mm. This sample was subjected to the measurement of a three-point bending strength at room temperature under the conditions of a cross head speed of 0.5 mm/min and a distance between the lower supports of 30 mm. The thermal expansion coefficient was measured by using an apparatus for measuring the thermal expansion coefficient. The results are shown in Table 2.

Also the above ground mixture was formed into a preform of cylindrical shape measuring 10 mm in diameter and 8 mm in height as a sample for evaluation of dielectric characteristics under a pressure of 100 MPa, fired under the conditions of a maximum temperature shown in Table 1 for one hour to obtain a sample measuring 8 mm in diameter and 6 mm in height.

With respect to the evaluation of dielectric characteristics, the relative dielectric constant $\in r$ of the sample was measured at frequency of 9 to 15 GHz using a dielectric circular cylinder resonator method, and the temperature coefficient $\tau f$ of the resonant frequency was measured at a temperature within a range from −40 to 85° C. The results are shown in Table 2. $\tau f$ [×10$^{-6}$/° C.] in the table is a value as measured at a temperature within a range from 25 to 85° C. and is represented by the following equation:

$$\tau f = (1/f_{25°\ C.})(f_{85°\ C.} - f_{25°\ C.})/(60°\ C.) \times 10^6$$

where $f_{25°\ C.}$ denotes the resonant frequency at 25° C. and $f_{85°\ C.}$ denotes the resonant frequency at 85° C. TCC in the table is a temperature coefficient of the electrostatic capacity and is represented by $\tau f$ and the thermal expansion coefficient $\alpha$ according to the following equation:

$$TCC = -2(\alpha + \tau f)$$

where the thermal expansion coefficient $\alpha$ is a value measure at a temperature within a range from room temperature to 400° C.

The crystal phase in the dielectric ceramics was identified by X-ray diffraction. The results are shown in Table 2.

TABLE 1

| No. | Glass Component | CT ** wt. % | Filler composition (wt. %) *** | | | | | | | | | | Firing temp. ° C. |
|---|---|---|---|---|---|---|---|---|---|---|---|---|---|---|
| | | wt. % | | AL | Ti | Zr | MT | BT | LT | NT | CN | SZ | CZ | |
| 1 | A | 60 | 10 | 29 | 1 | 0 | 0 | 0 | 0 | 0 | 0 | 0 | 0 | 900 |
| 2 | A | 70 | 10 | 19 | 1 | 0 | 0 | 0 | 0 | 0 | 0 | 0 | 0 | 900 |
| 3 | A | 65 | 5 | 29 | 0 | 1 | 0 | 0 | 0 | 0 | 0 | 0 | 0 | 900 |
| 4 | A | 68 | 7 | 24 | 0 | 1 | 0 | 0 | 0 | 0 | 0 | 0 | 0 | 900 |
| 5 | A | 72 | 3 | 24 | 0 | 0 | 1 | 0 | 0 | 0 | 0 | 0 | 0 | 890 |
| 6 | A | 75 | 5 | 20 | 0 | 0 | 0 | 0 | 0 | 0 | 0 | 0 | 0 | 850 |
| 7 | A | 65 | 13 | 10 | 0 | 0 | 0 | 1 | 1 | 10 | 0 | 0 | 0 | 900 |
| 8 | A | 60 | 15 | 5 | 0 | 0 | 0 | 0 | 0 | 10 | 10 | 0 | 0 | 1050 |
| * 9 | A | 60 | 0 | 40 | 0 | 0 | 0 | 0 | 0 | 0 | 0 | 0 | 0 | 890 |
| 10 | B | 60 | 9 | 30 | 1 | 0 | 0 | 0 | 0 | 0 | 0 | 0 | 0 | 910 |
| 11 | B | 70 | 9 | 20 | 0 | 0 | 0 | 0 | 0 | 0 | 0 | 0 | 0 | 890 |
| 12 | B | 80 | 10 | 9 | 0 | 0 | 1 | 0 | 0 | 0 | 0 | 0 | 0 | 850 |
| 13 | B | 62 | 8 | 29 | 0 | 1 | 0 | 0 | 0 | 0 | 0 | 1 | 0 | 910 |
| 14 | B | 52 | 8 | 39 | 0 | 0 | 0 | 0 | 0 | 0 | 0 | 0 | 1 | 910 |
| 15 | B | 74 | 6 | 20 | 0 | 0 | 0 | 0 | 0 | 0 | 0 | 0 | 0 | 910 |
| 16 | B | 64 | 6 | 30 | 0 | 0 | 0 | 0 | 0 | 0 | 0 | 0 | 0 | 910 |
| 17 | B | 54 | 6 | 40 | 0 | 0 | 0 | 0 | 0 | 0 | 0 | 0 | 0 | 910 |
| 18 | B | 58 | 7 | 35 | 0 | 0 | 0 | 0 | 0 | 0 | 0 | 0 | 0 | 910 |
| 19 | B | 53 | 7 | 40 | 0 | 0 | 0 | 0 | 0 | 0 | 0 | 0 | 0 | 910 |
| 20 | B | 48 | 7 | 45 | 0 | 0 | 0 | 0 | 0 | 0 | 0 | 0 | 0 | 930 |
| 21 | B | 50 | 20 | 20 | 0 | 0 | 0 | 0 | 0 | 10 | 0 | 0 | 0 | 1000 |
| 22 | B | 45 | 40 | 0 | 0 | 0 | 0 | 0 | 0 | 10 | 5 | 0 | 0 | 1050 |
| * 23 | B | 95 | 5 | 0 | 0 | 0 | 0 | 0 | 0 | 0 | 0 | 0 | 0 | 850 |
| 24 | B | 90 | 2 | 8 | 0 | 0 | 0 | 0 | 0 | 0 | 0 | 0 | 0 | 850 |
| 25 | B | 30 | 20 | 40 | 0 | 0 | 0 | 0 | 0 | 10 | 0 | 0 | 0 | 1050 |
| * 26 | B | 20 | 40 | 40 | 0 | 0 | 0 | 0 | 0 | 0 | 0 | 0 | 0 | Not fired |
| * 27 | B | 70 | 0 | 30 | 0 | 0 | 0 | 0 | 0 | 0 | 0 | 0 | 0 | 900 |
| * 28 | C | 60 | 10 | 30 | 0 | 0 | 0 | 0 | 0 | 0 | 0 | 0 | 0 | 900 |
| * 29 | B | 30 | 5 | 65 | 0 | 0 | 0 | 0 | 0 | 0 | 0 | 0 | 0 | Not fired |
| * 30 | B | 40 | 45 | 5 | 0 | 0 | 0 | 0 | 0 | 0 | 0 | 0 | 0 | 1050 |

Sample numbers marked with * are not within the scope of the present invention.
** CT: CaTiO$_3$
*** AL: Al$_2$O$_3$, Ti: TiO$_2$, Zr: ZrO$_2$, MT: MgTiO$_3$, BT: BaTi$_4$O$_9$, LT: La$_2$Ti$_2$O$_7$, NT: Nd$_2$Ti$_2$O$_7$, CN: Ca$_2$Nb$_2$O$_7$, SZ: SrZrO$_3$, CZ: CaZrO$_3$

TABLE 2

| No. | Bending strength MPa | Thermel expansion coefficient × 10$^{-6}$/° C. | Characteristics at 9 to 15 GHz | | | Crystal phase in dielectric ceramics ** |
|---|---|---|---|---|---|---|
| | | | $\in r$ | $\tau f$ × 10$^{-6}$/° C. | TCC × 10$^{-6}$/° C. | |
| 1 | 251 | 8.5 | 10.0 | 18.8 | −54.6 | D, CT, H, AL, W, G |
| 2 | 281 | 8.5 | 10.8 | 22.7 | −62.4 | D, CT, H, AL, W, G |
| 3 | 274 | 8.5 | 9.4 | −16.6 | 16.2 | D, CT, H, AL, W |
| 4 | 308 | 8.5 | 10.0 | −2.2 | −12.58 | D, CT, H, AL, W |
| 5 | 270 | 8.4 | 8.8 | −35.1 | 53.4 | D, CT, H, AL, W |
| 6 | 265 | 8.5 | 9.3 | −21.7 | 26.4 | D, CT, H, AL, W |
| 7 | 263 | 8.5 | 12.5 | 59.3 | −135.6 | D, CT, ST, H, AL, W |
| 8 | 252 | 8.5 | 15.9 | 59.0 | −135 | D, CT, ST, H, AL, W, NT, CN |

TABLE 2-continued

| No. | Bending strength MPa | Thermal expansion coefficient × 10⁻⁶/° C. | Characteristics at 9 to 15 GHz | | | Crystal phase in dielectric ceramics ** |
|---|---|---|---|---|---|---|
| | | | ε r | τ f × 10⁻⁶/° C. | TCC × 10⁻⁶/° C. | |
| * 9 | 276 | 8.4 | 8.1 | −63.3 | 109.8 | D, H, AL, W |
| 10 | 322 | 9.3 | 10.1 | 3.9 | −26.4 | D, CT, AL, A |
| 11 | 299 | 9.4 | 9.8 | −1.1 | −16.6 | D, CT, AL |
| 12 | 305 | 9.5 | 9.6 | −2.1 | −14.8 | D, CT, AL |
| 13 | 318 | 9.3 | 9.5 | −12.3 | 6 | D, CT, AL |
| 14 | 360 | 8.9 | 9.4 | −9.9 | 2 | D, CT, AL |
| 15 | 264 | 9.3 | 8.7 | −31.4 | 44.2 | D, CT, AL |
| 16 | 364 | 9.3 | 9.0 | −25.9 | 33.2 | D, CT, AL |
| 17 | 360 | 8.9 | 9.1 | −26.3 | 34.8 | D, CT, AL |
| 18 | 342 | 9.2 | 9.4 | −18.2 | 18 | D, CT, AL |
| 19 | 326 | 9 | 9.3 | −14.3 | 10.6 | D, CT, AL |
| 20 | 308 | 8.9 | 8.7 | −16 | 14.2 | D, CT, AL |
| 21 | 263 | 9.3 | 12.9 | 55 | −128.6 | D, CT, AL, NT, Co, Sp |
| 22 | 258 | 9.5 | 22 | 59.9 | −138.8 | D, CT, AL, NT, CN, M |
| * 23 | 240 | 9.7 | 7.9 | −69.0 | 118.6 | D, CT |
| 24 | 260 | 9.6 | 8 | −58.0 | 96.8 | D, CT, AL |
| 25 | 280 | 9.2 | 13.4 | 59 | −136.4 | D, CT, AL, NT |
| * 26 | Not evaluated due to not fired | — | — | — | — | — |
| * 27 | 340 | 9 | 7.7 | −67.7 | 117.4 | D, AL |
| * 28 | 220 | 7 | 8.5 | 5.5 | −25 | CT, AL, Ce |
| * 29 | Not evaluated due to not fired | — | — | — | — | — |
| * 30 | 310 | 9.4 | 25 | 99.9 | −218.6 | D, CT, AL |

Sample numbers marked with * are not within the scope of the present invention.
** D: Diopside, H: Hardystonite, Ce: Celsian, Co: Cordierite, G: Garnite, W: Willemite, Sp: Spinel, M: Mullite, CT: CaTiO₃, ST: SrTiO₃, AL: Al₂O₃, CN: Ca₂Nb₂O₇, NT: Nd₂Ti₂O₇, A: Anorthite As is apparent from the results of Table 2, in the samples Nos. 1 to 8, 10 to 22, 24 and 25, any dielectric ceramic composition could be fired together with a low-resistance conductor such as Ag or Cu at a temperature within a range from 850 to 1050° C.

These samples had excellent dielectric characteristics as follows: the relative dielectric constant is 8 to 22, the three-point bending strength of the ceramics is 250 MPa or larger, the temperature coefficient of the resonant frequency is 0±60×10⁻⁶/° C., and the temperature coefficient of the electrostatic capacity is 0±150×10⁻⁶/° C. Particularly, in the sample wherein the temperature coefficient of the electrostatic capacity of the dielectric ceramics is controlled to 0+40×10⁻⁶/° C., the temperature coefficient of the electrostatic capacity was 0±70×10⁻⁶/° C.

On the other hand, in the samples Nos. 9, 23 and 26 to 30, which do not contain calcium titanate or contain the diopside crystallized glass powder and calcium titanate in the amount that is not within a scope of the present invention, the three-point bending strength was smaller than 250 MPa or the temperature coefficient of the resonant frequency was not within a range of 0±60×10⁻⁶/° C.

Example 2

In the same manner as in Example 1, except that a strontium titanate powder (purity: 99% or higher) having a mean particle size of 2 μm was used in place of the calcium titanate powder used as the raw powder in Example 1, a dielectric ceramics was produced and evaluated. The composition is shown in Table 3 and the evaluation results are shown in Table 4.

TABLE 3

| | Glass | | ST ** | Filler composition (wt. %) *** | | | | | | | | | | Firing temp. |
|---|---|---|---|---|---|---|---|---|---|---|---|---|---|---|
| No. | Component | wt. % | (wt. %) | AL | Ti | Zr | MT | BT | LT | NT | CN | SZ | CZ | ° C. |
| 31 | A | 60 | 9 | 30 | 1 | 0 | 0 | 0 | 0 | 0 | 0 | 0 | 0 | 900 |
| 32 | A | 65 | 5 | 29 | 0 | 1 | 0 | 0 | 0 | 0 | 0 | 0 | 0 | 900 |
| 33 | A | 63 | 6 | 30 | 0 | 1 | 0 | 0 | 0 | 0 | 0 | 0 | 0 | 900 |
| 34 | A | 72 | 2 | 25 | 0 | 0 | 1 | 0 | 0 | 0 | 0 | 0 | 0 | 890 |
| 35 | A | 65 | 12 | 11 | 0 | 0 | 0 | 1 | 1 | 10 | 0 | 0 | 0 | 900 |
| 36 | A | 60 | 13 | 7 | 0 | 0 | 0 | 0 | 0 | 10 | 10 | 0 | 0 | 1050 |
| 37 | B | 60 | 9 | 30 | 1 | 0 | 0 | 0 | 0 | 0 | 0 | 0 | 0 | 910 |
| 38 | B | 70 | 9 | 20 | 0 | 1 | 0 | 0 | 0 | 0 | 0 | 0 | 0 | 890 |

TABLE 3-continued

| No. | Glass Component | ST** wt. % | Filler composition (wt. %) *** | | | | | | | | | | | Firing temp. °C. |
|---|---|---|---|---|---|---|---|---|---|---|---|---|---|---|
| | | | AL | Ti | Zr | MT | BT | LT | NT | CN | SZ | CZ | | |
| 39 | B | 80 | 10 | 9 | 0 | 0 | 1 | 0 | 0 | 0 | 0 | 0 | 0 | 850 |
| 40 | B | 72 | 6 | 22 | 0 | 0 | 0 | 0 | 0 | 0 | 0 | 0 | 0 | 910 |
| 41 | B | 62 | 7 | 30 | 0 | 0 | 0 | 0 | 0 | 0 | 0 | 1 | 0 | 910 |
| 42 | B | 52 | 7 | 40 | 0 | 0 | 0 | 0 | 0 | 0 | 0 | 0 | 1 | 910 |
| 43 | B | 74 | 5 | 21 | 0 | 0 | 0 | 0 | 0 | 0 | 0 | 0 | 0 | 910 |
| 44 | B | 65 | 5 | 30 | 0 | 0 | 0 | 0 | 0 | 0 | 0 | 0 | 0 | 910 |
| 45 | B | 55 | 5 | 39 | 0 | 0 | 0 | 0 | 0 | 0 | 0 | 1 | 0 | 910 |
| 46 | B | 53 | 6 | 41 | 0 | 0 | 0 | 0 | 0 | 0 | 0 | 0 | 0 | 910 |
| 47 | B | 54 | 6 | 40 | 0 | 0 | 0 | 0 | 0 | 0 | 0 | 0 | 0 | 910 |
| 48 | B | 50 | 20 | 20 | 0 | 0 | 0 | 0 | 0 | 10 | 0 | 0 | 0 | 1050 |
| 49 | B | 45 | 40 | 0 | 0 | 0 | 0 | 0 | 0 | 10 | 5 | 0 | 0 | 1050 |
| * 50 | B | 93 | 4 | 3 | 0 | 0 | 0 | 0 | 0 | 0 | 0 | 0 | 0 | 850 |
| 51 | B | 63 | 2 | 35 | 0 | 0 | 0 | 0 | 0 | 0 | 0 | 0 | 0 | 850 |
| 52 | B | 30 | 20 | 40 | 0 | 0 | 0 | 0 | 0 | 10 | 0 | 0 | 0 | 1050 |
| * 53 | B | 30 | 5 | 65 | 0 | 0 | 0 | 0 | 0 | 0 | 0 | 0 | 0 | Not fired |
| * 54 | B | 40 | 45 | 15 | 0 | 0 | 0 | 0 | 0 | 0 | 0 | 0 | 0 | 1050 |

Sample numbers marked with * are not within the scope of the present invention.
** ST: $SrTiO_3$
*** AL: $Al_2O_3$, Ti: $TiO_2$, Zr: $ZrO_2$, MT: $MgTiO_3$, BT: $BaTi_4O_9$, LT: $La_2Ti_2O_7$, NT: $Nd_2Ti_2O_7$, CN: $Ca_2Nb_2O_7$, SZ: $SrZrO_3$, CZ: $CaZrO_3$

TABLE 4

| No. | Bending strength MPa | Thermal expansion coefficient × $10^{-6}$/°C. | Characteristics at 9 to 15 GHz | | | Crystal phase in dielectric ceramics ** |
|---|---|---|---|---|---|---|
| | | | εr | τ f × $10^{-6}$/°C. | TCC × $10^{-6}$/°C. | |
| 31 | 250 | 8.7 | 10.1 | 53.6 | −124.6 | D, ST, H, AL, W, G |
| 32 | 270 | 8.7 | 9.2 | 13.8 | −45 | D, ST, H, AL, W |
| 33 | 305 | 8.7 | 9.8 | 23.8 | −65 | D, ST, H, AL, W |
| 34 | 255 | 8.5 | 8.7 | −16.1 | 15.2 | D, ST, H, AL, W |
| 35 | 250 | 8.7 | 12.1 | 55.0 | −127.4 | D, ST, H, AL, W, NT, Ce |
| 36 | 255 | 8.7 | 15.5 | 59.0 | −135.4 | D, ST, H, AL, W, NT, CN |
| 37 | 312 | 9.4 | 9.7 | 53.6 | −126 | D, ST, AL, A |
| 38 | 305 | 9.5 | 9.4 | 53.6 | −126.2 | D, ST, AL |
| 39 | 305 | 9.7 | 9.2 | 59.9 | −139.2 | D, ST, AL |
| 40 | 305 | 9.4 | 9.9 | 23.8 | −66.4 | D, ST, AL |
| 41 | 302 | 9.4 | 9.1 | 33.7 | −86.2 | D, ST, AL |
| 42 | 255 | 9 | 8.9 | 33.7 | −85.4 | D, ST, AL |
| 43 | 255 | 9.4 | 8.3 | 13.8 | −46.4 | D, ST, AL |
| 44 | 350 | 9.4 | 8.6 | 13.8 | −46.4 | D, ST, AL |
| 45 | 350 | 9 | 8.7. | 13.8 | −45.6 | D, ST, AL |
| 46 | 350 | 9.3 | 9.0 | 23.8 | −66.2 | D, ST, AL |
| 47 | 350 | 9.1 | 8.9 | 23.8 | −65.8 | D, ST, AL |
| 48 | 290 | 9.4 | 12.5 | 55 | −128.8 | D, CT, AL, NT, Co, Sp |
| 49 | 270 | 9.6 | 21.5 | 59.9 | −139 | D, CT, AL, NT, CN, M |
| * 50 | 220 | 9.8 | 7.5 | 3.8 | −27.2 | D, ST |
| 51 | 255 | 9.8 | 8 | −16.4 | 13.2 | D, ST, AL |
| 52 | 255 | 9.3 | 13 | 59.0 | −136.6 | D, ST, AL, NT |
| * 53 | Not evaluated due to not fired | — | — | — | — | — |
| * 54 | 295 | 9.6 | 24.5 | 99.9 | −219 | D, ST, AL |

Sample numbers marked with * are not within the scope of the present invention.
** D: Diopside, H: Hardystonite, Ce: Celsian, Co: Cordierite, G: Garnite, W: Willemite, Sp: Spinel, M: Mullite, CT: $CaTiO_3$, ST: $SrTiO_3$, AL: $Al_2O_3$, CN: $Ca_2Nb_2O_7$, NT: $Nd_2Ti_2O_7$, A: Anorthite As is apparent from the results of Table 4, in the samples Nos. 31 to 49, 51 and 52 of the present invention, any dielectric ceramic composition could be fired together with a low-resistance conductor such as Ag or Cu at a temperature within a range from 850 to 1050° C.

These samples had excellent dielectric characteristics as follows: the relative dielectric constant is 8 to 21.5, the three-point bending strength of the ceramics is 250 MPa or larger, the temperature coefficient of the resonant frequency is within a range from $-16.4\times10^{-6}/°$ C. to $59.9\times10^{-6}/°$ C., and the temperature coefficient of the electrostatic capacity is within a range from $-139.2\times10^{-6}/°$ C. to $15.2\times10^{-6}/°$ C.

On the other hand, in the samples Nos. 50, 53 and 54 which contain the diopside crystallized glass powder and strontium titanate that is not within a scope of the present invention, sintering could not be conducted, or the three-point bending strength was smaller than 250 MPa or the temperature coefficient of the resonant frequency was not within a range of $0\pm60\times10^{-6}/°$ C.

Example 3

In the same manner as in Example 1, except that a mixed powder of a calcium titanate powder and a strontium titanate powder, each having a mean particle size of 2 μm and a purity of 99% or higher, was used in place of the calcium titanate powder used as the raw powder in Example 1, a dielectric ceramics was produced and evaluated. The composition is shown in Table 5 and the evaluation results are shown in Table 6.

As is apparent from the results of Table 6, in the samples Nos. 55 to 61 of the present invention, any dielectric ceramic composition could be fired together with a low-resistance conductor such as Ag or Cu at a temperature within a range from 900 to 930° C.

These samples had excellent dielectric characteristics as follows: the relative dielectric constant is 8 to 21, the three-point bending strength of the ceramics is 250 MPa or larger, the temperature coefficient of the resonant frequency is within a range from $-59\times10^{6}/°$ C. to $16.5\times10^{-6}/°$ C., and the temperature coefficient of the electrostatic capacity is within a range from $14.4\times10^{-6}/°$ C. to $99\times10^{-6}/°$ C. Particularly, in the sample wherein the temperature coefficient of the electrostatic capacity of the dielectric ceramics is controlled to $0+40\times10^{-6}/°$ C., the temperature coefficient of the electrostatic capacity was $0+70\times10^{-6}/°$ C.

Example 4

First, a glass frit which is a crystallized glass powder capable of depositing a diopside crystal, $CaTiO_3$, $SrTiO_3$ and $Al_2O_3$, $TiO_2$, $ZrO_2$, $MgTiO_3$, $BaTi_4O_9$, $La_2Ti_2O_7$, $Nd_2Ti_2O$, $Ca_2Nb_2O_7$, $SrZrO_3$ and $CaZrO_3$ powders, each having purity of 99% or higher, and $Fe_2O_3$, $Cr_2O_3$, ZnO, CuO, $Ag_2O$, $Co_3O_4$, $MnO_2$, $CeO_2$ and $R_2O_3$ (R represents a rare earth element) were weighed and mixed with water in proportions shown in Tables 7 to 9 in wet process (medium: isopropyl alcohol) for 20 hours in a ball mill using $ZrO_2$ balls to obtain a ground mixture having a particle size of 2.0 μm or smaller.

The following glass frits were used.

TABLE 5

| No. | Glass Component | wt. % | CT** (wt. %) | ST** (wt. %) | Filler composition (wt. %) *** | | | | | | | | | | Firing temp. ° C. |
|---|---|---|---|---|---|---|---|---|---|---|---|---|---|---|---|
| | | | | | AL | Ti | Zr | MT | BT | LT | NT | CN | SZ | CZ | |
| 55 | B | 58 | 3 | 4 | 35 | 0 | 0 | 0 | 0 | 0 | 0 | 0 | 0 | 0 | 900 |
| 56 | B | 58 | 1 | 6 | 35 | 0 | 0 | 0 | 0 | 0 | 0 | 0 | 0 | 0 | 900 |
| 57 | B | 48 | 1 | 20 | 21 | 0 | 0 | 0 | 0 | 0 | 10 | 0 | 0 | 0 | 900 |
| 58 | B | 48 | 1 | 39 | 2 | 0 | 0 | 0 | 0 | 0 | 10 | 0 | 0 | 0 | 930 |
| 59 | B | 72 | 7 | 1 | 20 | 0 | 0 | 0 | 0 | 0 | 10 | 0 | 0 | 0 | 930 |
| 60 | A | 60 | 4 | 1 | 35 | 0 | 0 | 0 | 0 | 0 | 0 | 0 | 0 | 0 | 930 |
| 61 | A | 55 | 4 | 1 | 40 | 0 | 0 | 0 | 0 | 0 | 0 | 0 | 0 | 0 | 900 |

** CT: $CaTiO_3$, ST: $SrTiO_3$
*** AL: $Al_2O_3$, Ti: $TiO_2$, Zr: $ZrO_2$, MT: $MgTiO_3$, BT: $BaTi_4O_9$, LT: $La_2Ti_2O_7$, NT: $Nd2Ti_2O_7$, CN: $Ca_2Nb_2O_7$, SZ: $SrZrO_3$, CZ: $CaZrO_3$

TABLE 6

| No. | Bending strength MPa | Thermel expansion coefficient × $10^{-6}/°$ C. | Characteristics at 9 to 15 GHz | | | Crystal phase in dielectric ceramics ** |
|---|---|---|---|---|---|---|
| | | | ε r | τ f × $10^{-6}/°$ C. | TCC × $10^{-6}/°$ C. | |
| 55 | 290 | 9.3 | 9.0 | −29.9 | 41.2 | D, CT, H, AL, ST |
| 56 | 277 | 9.4 | 8.9 | −39.9 | 61 | D, CT, H, AL, ST |
| 57 | 260 | 9.5 | 15.0 | −50.0 | 81 | D, CT, H, AL, ST, NT |
| 58 | 260 | 9.5 | 21.0 | −59.0 | 99 | D, CT, H, AL, ST, NT |
| 59 | 309 | 9.3 | 9.3 | −16.5 | 14.4 | D, CT, ST, AL |
| 60 | 268 | 8.5 | 9.1 | −16.9 | 16.8 | D, CT, ST, H, AL, W |
| 61 | 250 | 8.5 | 8.0 | −20.9 | 24.8 | D, CT, ST, H, AL, W |

** D: Diopside, H: Hardystonite, W: Willemite, ST: $SrTiO_3$, AL: $Al_2O_3$, NT: $Nd_2Ti_2O_7$ Glass frit D: 41 wt % $SiO_2$-23 wt % CaO-15 wt % MgO-21 wt % ZnO Glass frit E: 49 wt % $SiO_2$-33 wt % CaO-18 wt % MgO In the sample No. 89, the glass flit C was used as Comparative Example. Using the resulting mixture, a dielectric ceramics was produced and evaluated in the same manner as in Example 1. Discoloration and color tone of the dielectric ceramics were visually observed. The results are shown in Tables 10 to 12.

TABLE 7

| No. | Glass Component | wt. % | CT ** (wt. %) | Filler composition (wt. %) *** | | | | | | | | | | Additive composition (parts by weight) | | |
|---|---|---|---|---|---|---|---|---|---|---|---|---|---|---|---|---|
| | | | | AL | Ti | Zr | MT | BT | LT | NT | CN | SZ | CZ | $Fe_2O_3$ | $Cr_2O_3$ | ZnO |
| 62 | D | 60 | 10 | 29 | 1 | 0 | 0 | 0 | 0 | 0 | 0 | 0 | 0 | 0.1 | 0 | 0 |
| 63 | D | 70 | 10 | 19 | 1 | 0 | 0 | 0 | 0 | 0 | 0 | 0 | 0 | 0.1 | 0.1 | 0 |
| 64 | D | 65 | 5 | 29 | 0 | 1 | 0 | 0 | 0 | 0 | 0 | 0 | 0 | 0.1 | 0.1 | 0.1 |
| 65 | D | 68 | 7 | 24 | 0 | 1 | 0 | 0 | 0 | 0 | 0 | 0 | 0 | 0.1 | 0 | 0 |
| 66 | D | 72 | 3 | 24 | 0 | 0 | 1 | 0 | 0 | 0 | 0 | 0 | 0 | 0.2 | 0 | 0 |
| 67 | D | 75 | 5 | 20 | 0 | 0 | 0 | 0 | 0 | 0 | 0 | 0 | 0 | 0.2 | 0 | 0 |
| 68 | D | 65 | 13 | 10 | 0 | 0 | 0 | 1 | 1 | 10 | 0 | 0 | 0 | 0.1 | 0.5 | 0 |
| 69 | D | 60 | 15 | 5 | 0 | 0 | 0 | 0 | 0 | 10 | 10 | 0 | 0 | 0.1 | 1 | 0 |
| * 70 | D | 60 | 0 | 40 | 0 | 0 | 0 | 0 | 0 | 0 | 0 | 0 | 0 | 0.1 | 0 | 1 |
| 71 | E | 60 | 9 | 30 | 1 | 0 | 0 | 0 | 0 | 0 | 0 | 0 | 0 | 0.1 | 0 | 0 |
| 72 | E | 70 | 9 | 20 | 0 | 0 | 0 | 0 | 0 | 0 | 0 | 0 | 0 | 0.1 | 0 | 0 |
| 73 | E | 80 | 10 | 9 | 1 | 0 | 1 | 0 | 0 | 0 | 0 | 0 | 0 | 0.1 | 0 | 0 |
| 74 | E | 62 | 6 | 29 | 0 | 1 | 0 | 0 | 0 | 0 | 0 | 1 | 0 | 0.1 | 0 | 0 |
| 75 | E | 52 | 8 | 39 | 0 | 0 | 0 | 0 | 0 | 0 | 0 | 0 | 1 | 0.1 | 0 | 0 |
| 76 | E | 74 | 6 | 20 | 0 | 0 | 0 | 0 | 0 | 0 | 0 | 0 | 0 | 0.1 | 0 | 0 |
| 77 | E | 64 | 6 | 30 | 0 | 0 | 0 | 0 | 0 | 0 | 0 | 0 | 0 | 0.1 | 0 | 0 |
| 78 | E | 54 | 6 | 40 | 0 | 0 | 0 | 0 | 0 | 0 | 0 | 0 | 0 | 0.1 | 0 | 0 |
| 79 | E | 58 | 7 | 35 | 0 | 0 | 0 | 0 | 0 | 0 | 0 | 0 | 0 | 0.1 | 0 | 0 |
| 80 | E | 53 | 7 | 40 | 0 | 0 | 0 | 0 | 0 | 0 | 0 | 0 | 0 | 0.5 | 0 | 0 |
| 81 | E | 48 | 7 | 45 | 0 | 0 | 0 | 0 | 0 | 0 | 0 | 0 | 0 | 1 | 0 | 0 |
| 82 | E | 50 | 20 | 20 | 0 | 0 | 0 | 0 | 0 | 10 | 0 | 0 | 0 | 1.5 | 0 | 0 |
| 83 | E | 45 | 40 | 0 | 0 | 0 | 0 | 0 | 0 | 10 | 5 | 0 | 0 | 2 | 0 | 0 |
| * 84 | E | 95 | 5 | 0 | 0 | 0 | 0 | 0 | 0 | 0 | 0 | 0 | 0 | 2.2 | 0 | 0 |
| 85 | E | 90 | 2 | 6 | 0 | 0 | 0 | 0 | 0 | 0 | 0 | 0 | 0 | 0.1 | 0 | 0 |
| 86 | E | 30 | 20 | 40 | 0 | 0 | 0 | 0 | 0 | 10 | 0 | 0 | 0 | 0.1 | 0 | 0 |
| * 87 | E | 20 | 40 | 40 | 0 | 0 | 0 | 0 | 0 | 0 | 0 | 0 | 0 | 0.1 | 0 | 0 |
| * 88 | E | 70 | 0 | 30 | 0 | 0 | 0 | 0 | 0 | 0 | 0 | 0 | 0 | 0 | 0 | 0 |
| * 89 | C | 60 | 10 | 30 | 0 | 0 | 0 | 0 | 0 | 0 | 0 | 0 | 0 | 1 | 1 | 1 |
| * 90 | E | 30 | 5 | 65 | 0 | 0 | 0 | 0 | 0 | 0 | 0 | 0 | 0 | 0.1 | 0 | 0 |
| * 91 | E | 40 | 45 | 5 | 0 | 0 | 0 | 0 | 0 | 0 | 0 | 0 | 0 | 0.05 | 0 | 0 |

| No. | Additive composition (parts by weight) | | | | | | | | | | Firing temp. ° C. |
|---|---|---|---|---|---|---|---|---|---|---|---|
| | CuO | $Ag_2O$ | $Co_3O_4$ | $MnO_2$ | $CeO_2$ | $Y_2O_3$ | $La_2O_3$ | $Nd_2O_3$ | $Sm_2O_3$ | $Er_2O_3$ | |
| | | | | | | $R_2O_3$ (R represents rare-earth element) | | | | | |
| 62 | 0 | 0 | 0 | 0 | 0 | 0 | 0 | 0 | 0 | 0 | 900 |
| 63 | 0 | 0 | 0 | 0 | 0 | 0 | 0 | 0 | 0 | 0 | 900 |
| 64 | 0 | 0 | 0 | 0 | 0 | 0 | 0 | 0 | 0 | 0 | 900 |
| 65 | 0.1 | 0 | 0 | 0 | 0 | 0 | 0 | 0 | 0 | 0 | 900 |
| 66 | 0 | 0 | 0 | 0 | 0 | 0 | 0 | 0 | 0 | 0 | 890 |
| 67 | 0 | 0 | 0 | 0 | 0 | 0 | 0 | 0 | 0 | 0 | 850 |
| 68 | 0 | 0 | 0 | 0 | 0 | 0 | 0 | 0 | 0 | 0 | 900 |
| 69 | 0 | 0 | 0 | 0 | 0 | 0 | 0 | 0 | 0 | 0 | 1050 |
| * 70 | 0 | 0 | 0 | 0 | 0 | 0 | 0 | 0 | 0 | 0 | 890 |
| 71 | 1 | 0 | 0 | 0 | 0 | 0 | 0 | 0 | 0 | 0 | 910 |
| 72 | 0 | 1 | 0 | 0 | 0 | 0 | 0 | 0 | 0 | 0 | 890 |
| 73 | 0 | 0 | 1 | 0 | 0 | 0 | 0 | 0 | 0 | 0 | 850 |
| 74 | 0 | 0 | 0 | 0 | 1 | 0 | 0 | 0 | 0 | 0 | 910 |
| 75 | 0 | 0 | 0 | 0 | 0 | 1 | 0 | 0 | 0 | 0 | 910 |
| 76 | 0 | 0 | 0 | 0 | 0 | 0 | 1 | 0 | 0 | 0 | 910 |
| 77 | 0 | 0 | 0 | 0 | 0 | 0 | 0 | 1 | 0 | 0 | 910 |
| 78 | 0 | 0 | 0 | 0 | 0 | 0 | 0 | 0 | 1 | 0 | 910 |
| 79 | 0 | 0 | 0 | 0 | 0 | 0 | 0 | 0 | 0 | 1 | 910 |
| 80 | 0 | 0 | 0 | 0 | 0 | 0 | 0 | 0 | 0 | 0 | 910 |
| 81 | 0 | 0 | 0 | 0 | 0 | 0 | 0 | 0 | 0 | 0 | 930 |
| 82 | 0 | 0 | 0 | 0 | 0 | 0 | 0 | 0 | 0 | 0 | 1000 |
| 83 | 0 | 0 | 0 | 0 | 0 | 0 | 0 | 0 | 0 | 0 | 1050 |
| * 84 | 0 | 0 | 0 | 0 | 0 | 0 | 0 | 0 | 0 | 0 | 850 |
| 85 | 0 | 0 | 0 | 0 | 0 | 0 | 0 | 0 | 0 | 0 | 850 |
| 86 | 0 | 0 | 0 | 0 | 0 | 0 | 0 | 0 | 0 | 0 | 1050 |
| * 87 | 0 | 0 | 0 | 0 | 0 | 0 | 0 | 0 | 0 | 0 | Not fired |

TABLE 7-continued

| | | | | | | | | | | | | |
|---|---|---|---|---|---|---|---|---|---|---|---|---|
| * 88 | 0 | 0 | 0 | 0 | 0 | 0 | 0 | 0 | 0 | 0 | 900 |
| * 89 | 0 | 0 | 0 | 0 | 0 | 0 | 0 | 0 | 0 | 0 | 900 |
| * 90 | 0 | 0 | 0 | 0 | 0 | 0 | 0 | 0 | 0 | 0 | Not fired |
| * 91 | 0 | 0 | 0 | 0 | 0 | 0 | 0 | 0 | 0 | 0 | 1050 |

Sample numbers marked with * are not within the scope of the present invention.
** CT: $CaTiO_3$
*** AL: $Al_2O_3$, Ti: $TiO_2$, Zr: $ZrO_2$, MT: $MgTiO_3$, BT: $BaTi_4O_9$, LT: $La_2Ti_2O_7$, NT: $Nd_{2AL}Ti_2O_7$, CN: $Ca_2Nb_2O_7$, SZ: $SrZrO_3$, CZ: $CaZrO_3$

TABLE 8

| | Glass | | | Filler composition (wt. %) *** | | | | | | | | | Additive composition (parts by weight) | | |
|---|---|---|---|---|---|---|---|---|---|---|---|---|---|---|---|
| No. | Component | wt. % | ST ** (wt. %) | AL | Ti | Zr | MT | BT | LT | NT | CN | SZ | CZ | $Fe_2O_3$ | $Cr_2O_3$ | ZnO |
| 92 | D | 60 | 9 | 30 | 1 | 0 | 0 | 0 | 0 | 0 | 0 | 0 | 0 | 0.1 | 0 | 0 |
| 93 | D | 65 | 5 | 30 | 0 | 1 | 0 | 0 | 0 | 0 | 0 | 0 | 0 | 0.1 | 0.1 | 0.1 |
| 94 | D | 63 | 6 | 29 | 0 | 1 | 0 | 0 | 0 | 0 | 0 | 0 | 0 | 0.1 | 0 | 0 |
| 95 | D | 72 | 2 | 25 | 0 | 0 | 1 | 0 | 0 | 0 | 0 | 0 | 0 | 0.2 | 0 | 0 |
| 96 | D | 65 | 12 | 11 | 0 | 0 | 0 | 1 | 1 | 10 | 0 | 0 | 0 | 0.1 | 0.5 | 0 |
| 97 | D | 60 | 13 | 7 | 0 | 0 | 0 | 0 | 0 | 10 | 10 | 0 | 0 | 0.1 | 1 | 0 |
| * 98 | D | 60 | 0 | 40 | 0 | 0 | 0 | 0 | 0 | 0 | 0 | 0 | 0 | 0.1 | 0 | 1 |
| 99 | E | 60 | 9 | 30 | 1 | 0 | 0 | 0 | 0 | 0 | 0 | 0 | 0 | 0.1 | 0 | 0 |
| 100 | E | 70 | 9 | 20 | 0 | 1 | 0 | 0 | 0 | 0 | 0 | 0 | 0 | 0.1 | 0 | 0 |
| 101 | E | 80 | 10 | 9 | 0 | 0 | 1 | 0 | 0 | 0 | 0 | 0 | 0 | 0.1 | 0 | 0 |
| 102 | E | 72 | 6 | 21 | 0 | 0 | 0 | 0 | 0 | 0 | 0 | 0 | 0 | 0.1 | 0 | 0 |
| 103 | E | 62 | 7 | 30 | 0 | 0 | 0 | 0 | 0 | 0 | 0 | 1 | 0 | 0.1 | 0 | 0 |
| 104 | E | 52 | 7 | 40 | 0 | 0 | 0 | 0 | 0 | 0 | 0 | 0 | 1 | 0.1 | 0 | 0 |
| 105 | E | 74 | 5 | 21 | 0 | 0 | 0 | 0 | 0 | 0 | 0 | 0 | 0 | 0.1 | 0 | 0 |
| 106 | E | 65 | 5 | 30 | 0 | 0 | 0 | 0 | 0 | 0 | 0 | 0 | 0 | 0.1 | 0 | 0 |
| 107 | E | 55 | 5 | 40 | 0 | 0 | 0 | 0 | 0 | 0 | 0 | 0 | 0 | 0.1 | 0 | 0 |
| 108 | E | 53 | 6 | 36 | 0 | 0 | 0 | 0 | 0 | 0 | 0 | 0 | 0 | 0.1 | 0 | 0 |
| 109 | E | 54 | 6 | 40 | 0 | 0 | 0 | 0 | 0 | 0 | 0 | 0 | 0 | 0.5 | 0 | 0 |
| 110 | E | 50 | 20 | 20 | 0 | 0 | 0 | 0 | 0 | 10 | 0 | 0 | 0 | 1.5 | 0 | 0 |
| 111 | E | 45 | 40 | 0 | 0 | 0 | 0 | 0 | 0 | 10 | 5 | 0 | 0 | 2 | 0 | 0 |
| * 112 | E | 93 | 4 | 0 | 0 | 0 | 0 | 0 | 0 | 0 | 0 | 0 | 0 | 2.2 | 0 | 0 |
| 113 | E | 63 | 2 | 9 | 0 | 0 | 0 | 0 | 0 | 0 | 0 | 0 | 0 | 0.1 | 0 | 0 |
| 114 | E | 30 | 20 | 40 | 0 | 0 | 0 | 0 | 0 | 10 | 0 | 0 | 0 | 0.1 | 0 | 0 |
| * 115 | E | 30 | 5 | 65 | 0 | 0 | 0 | 0 | 0 | 0 | 0 | 0 | 0 | 0.1 | 0 | 0 |
| * 116 | E | 40 | 45 | 5 | 0 | 0 | 0 | 0 | 0 | 0 | 0 | 0 | 0 | 0.05 | 0 | 0 |

| | Additive composition (parts by weight) | | | | | | | | | Firing temp. |
|---|---|---|---|---|---|---|---|---|---|---|
| No. | CuO | $Ag_2O$ | $Co_3O_4$ | $MnO_2$ | $CeO_2$ | $Y_2O_3$ | $La_2O_3$ | $Nd_2O_3$ | $Sm_2O_3$ | $Er_2O_3$ | °C. |
| 92 | 0 | 0 | 0 | 0 | 0 | 0 | 0 | 0 | 0 | 0 | 900 |
| 93 | 0 | 0 | 0 | 0 | 0 | 0 | 0 | 0 | 0 | 0 | 900 |
| 94 | 0.1 | 0 | 0 | 0 | 0 | 0 | 0 | 0 | 0 | 0 | 900 |
| 95 | 0 | 0 | 0 | 0 | 0 | 0 | 0 | 0 | 0 | 0 | 890 |
| 96 | 0 | 0 | 0 | 0 | 0 | 0 | 0 | 0 | 0 | 0 | 900 |
| 97 | 0 | 0 | 0 | 0 | 0 | 0 | 0 | 0 | 0 | 0 | 1050 |
| * 98 | 0 | 0 | 0 | 0 | 0 | 0 | 0 | 0 | 0 | 0 | 890 |
| 99 | 1 | 0 | 0 | 0 | 0 | 0 | 0 | 0 | 0 | 0 | 910 |
| 100 | 0 | 1 | 0 | 0 | 0 | 0 | 0 | 0 | 0 | 0 | 890 |
| 101 | 0 | 0 | 1 | 0 | 0 | 0 | 0 | 0 | 0 | 0 | 850 |
| 102 | 0 | 0 | 0 | 1 | 0 | 0 | 0 | 0 | 0 | 0 | 910 |
| 103 | 0 | 0 | 0 | 0 | 1 | 0 | 0 | 0 | 0 | 0 | 910 |
| 104 | 0 | 0 | 0 | 0 | 0 | 1 | 0 | 0 | 0 | 0 | 910 |
| 105 | 0 | 0 | 1 | 0 | 0 | 0 | 1 | 0 | 0 | 0 | 910 |
| 106 | 0 | 0 | 0 | 1 | 0 | 0 | 0 | 1 | 0 | 0 | 910 |
| 107 | 0 | 0 | 0 | 0 | 0 | 0 | 0 | 0 | 1 | 0 | 910 |
| 108 | 0 | 0 | 0 | 0 | 0 | 0 | 0 | 0 | 0 | 1 | 910 |
| 109 | 0 | 0 | 0 | 0 | 0 | 0 | 0 | 0 | 0 | 0 | 910 |
| 110 | 0 | 0 | 0 | 0 | 0 | 0 | 0 | 0 | 0 | 0 | 1050 |
| 111 | 0 | 0 | 0 | 0 | 0 | 0 | 0 | 0 | 0 | 0 | 1050 |
| * 112 | 0 | 0 | 0 | 0 | 0 | 0 | 0 | 0 | 0 | 0 | 850 |
| 113 | 0 | 0 | 0 | 0 | 0 | 0 | 0 | 0 | 0 | 0 | 850 |
| 114 | 0 | 0 | 0 | 0 | 0 | 0 | 0 | 0 | 0 | 0 | 1050 |
| * 115 | 0 | 0 | 0 | 0 | 0 | 0 | 0 | 0 | 0 | 0 | Not |

TABLE 8-continued

| | | | | | | | | | | | | fired |
|---|---|---|---|---|---|---|---|---|---|---|---|---|
| * 116 | 0 | 0 | 0 | 0 | 0 | 0 | 0 | 0 | 0 | 0 | 0 | 1050 |

Sample numbers marked with * are not within the scope of the present invention.
** ST: $SrTiO_3$
*** AL: $Al_2O_3$, Ti: $TiO_2$, Zr: $ZrO_2$, MT: $MgTiO_3$, BT: $BaTi_4O_9$, LT: $La_2Ti_2O_7$, NT: $Nd_2Ti_2O_7$, CN: $Ca_2Nb_2O_7$, SZ: $SrZrO_3$, CZ: $CaZrO_3$

TABLE 9

| | Glass | | | | Filler composition (wt. %) *** | | | | | | | | | Additive composition (parts by weight) | | |
|---|---|---|---|---|---|---|---|---|---|---|---|---|---|---|---|---|
| | Com- | | CT ** | ST ** | | | | | | | | | | | | |
| No. | ponent | wt. % | (wt. %) | (wt. %) | AL | Ti | Zr | MT | BT | LT | NT | CN | SZ | CZ | $Fe_2O_3$ | $Cr_2O_3$ | ZnO |
| 117 | E | 58 | 5 | 2 | 35 | 0 | 0 | 0 | 0 | 0 | 0 | 0 | 0 | 0 | 0.1 | 0 | 0 |
| 118 | E | 58 | 3 | 4 | 35 | 0 | 0 | 0 | 0 | 0 | 0 | 0 | 0 | 0 | 0.1 | 0 | 0 |
| 119 | E | 58 | 1 | 6 | 35 | 0 | 0 | 0 | 0 | 0 | 0 | 0 | 0 | 0 | 0.1 | 0 | 0 |
| 120 | E | 48 | 1 | 20 | 21 | 0 | 0 | 0 | 0 | 0 | 10 | 0 | 0 | 0 | 0.1 | 0 | 0 |
| 121 | E | 48 | 1 | 39 | 2 | 0 | 0 | 0 | 0 | 0 | 10 | 0 | 0 | 0 | 0.1 | 0 | 0 |
| 122 | E | 72 | 7 | 1 | 20 | 0 | 0 | 0 | 0 | 0 | 10 | 0 | 0 | 0 | 0.1 | 0 | 0 |
| 123 | D | 60 | 4 | 1 | 35 | 0 | 0 | 0 | 0 | 0 | 0 | 0 | 0 | 0 | 0.1 | 0.1 | 0 |
| 124 | D | 55 | 4 | 1 | 40 | 0 | 0 | 0 | 0 | 0 | 0 | 0 | 0 | 0 | 0.1 | 0.2 | 0 |

| | Additive composition (parts by weight) | | | | | | | | | | Firing |
|---|---|---|---|---|---|---|---|---|---|---|---|
| | | | | | | | $R_2O_3$ (R represents rare-earth element) | | | | temp. |
| No. | CuO | $Ag_2O$ | $Co_3O_4$ | $MnO_2$ | $CeO_2$ | $Y_2O_3$ | $La_2O_3$ | $Nd_2O_3$ | $Sm_2O_3$ | $Er_2O_3$ | ° C. |
| 117 | 0 | 0 | 0 | 0 | 0 | 0 | 0 | 0 | 0 | 0 | 900 |
| 118 | 0 | 0 | 0 | 0 | 0 | 0 | 0 | 0 | 0 | 0 | 900 |
| 119 | 0 | 0 | 0 | 0 | 0 | 0 | 0 | 0 | 0 | 0.5 | 900 |
| 120 | 0 | 0 | 0 | 0 | 0 | 0 | 0 | 0 | 0 | 0.5 | 930 |
| 121 | 0 | 0 | 0 | 0 | 0 | 0 | 0 | 0 | 0 | 0.5 | 930 |
| 122 | 0 | 0 | 0 | 0 | 0 | 0 | 0 | 0 | 0 | 0.5 | 930 |
| 123 | 0 | 0.1 | 0 | 0 | 0 | 0 | 0 | 0 | 0 | 0 | 900 |
| 124 | 0 | 0 | 0 | 0 | 0 | 0 | 0 | 0 | 0 | 0 | 900 |

** CT: $CaTiO_3$, ST: $SrTiO_3$
*** AL: $Al_2O_3$, Ti: $TiO_2$, Zr: $ZrO_2$, MT: $MgTiO_3$, BT: $BaTi_4O_9$, LT: $La_2Ti_2O_7$, NT: $Nd_2Ti_2O_7$, CN: $Ca_2Nb_2O_7$, SZ: $SrZrO_3$, CZ: $CaZrO_3$

TABLE 10

| No. | Bending strength MPa | Thermal expansion coefficient × $10^{-6}$/° C. | $\epsilon r$ | Characteristics at 9 to 15 GHz | | Coloration or Prevention of discoloration | Color tone | Crystal phase in dielectric ceramics ** |
|---|---|---|---|---|---|---|---|---|
| | | | | $\tau f \times 10^{-6}$/° C. | TCC × $10^{-6}$/° C. | | | |
| 62 | 251 | 8.5 | 9.8 | 18.8 | −54.6 | Yes | Red | D, CT, H, AL, W, G |
| 63 | 281 | 8.5 | 10.6 | 22.7 | −62.4 | Yes | Brown | D, CT, H, AL, W, G |
| 64 | 274 | 8.5 | 9.2 | −16.6 | 16.2 | Yes | Brown | D, CT, H, AL, W |
| 65 | 308 | 8.5 | 9.8 | −2.2 | −12.58 | Yes | Brown | D, CT, H, AL, W |
| 66 | 270 | 8.4 | 8.6 | −35.1 | 53.4 | Yes | Red | D, CT, H, AL, W |
| 67 | 265 | 8.5 | 9.1 | −21.7 | 26.4 | Yes | Red | D, CT, H, AL, W |
| 68 | 263 | 8.5 | 12.3 | 59.3 | −135.6 | Yes | Brown | D, CT, ST, H, AL, W |
| 69 | 252 | 8.5 | 15.7 | 59.0 | −135 | Yes | Brown | D, CT, ST, H, AL, W, NT, CN |
| * 70 | 276 | 8.4 | 7.9 | −63.3 | 109.8 | Yes | Brown | D, H, AL, W |
| 71 | 322 | 9.3 | 9.9 | 3.9 | −26.4 | Yes | Brown | D, CT, AL, A |
| 72 | 299 | 9.4 | 9.7 | −1.1 | −16.6 | Yes | Brown | D, CT, AL |
| 73 | 305 | 9.5 | 9.4 | −2.1 | −14.8 | Yes | Brown | D, CT, AL |
| 74 | 318 | 9.3 | 9.3 | −12.3 | 6 | Yes | Brown | D, CT, AL |
| 75 | 360 | 8.9 | 9.2 | −9.9 | 2 | Yes | Red | D, CT, AL |
| 76 | 264 | 9.3 | 8.5 | −31.4 | 44.2 | Yes | Red | D, CT, AL |
| 77 | 364 | 9.3 | 8.8 | −25.9 | 33.2 | Yes | Red | D, CT, AL |
| 78 | 360 | 8.9 | 8.9 | −26.3 | 34.8 | Yes | Red | D, CT, AL |
| 79 | 342 | 9.2 | 9.2 | −18.2 | 18 | Yes | Red | D, CT, AL |
| 80 | 326 | 9 | 9.1 | −14.3 | 10.6 | Yes | Red | D, CT, AL |
| 81 | 308 | 8.9 | 8.5 | −16 | 14.2 | Yes | Red | D, CT, AL |

TABLE 10-continued

| No. | Bending strength MPa | Thermal expansion coefficient × $10^{-6}/°C$ | $\epsilon r$ | $\tau f \times 10^{-6}/°C$ | TCC × $10^{-6}/°C$ | Coloration or Prevention of discoloration | Color tone | Crystal phase in dielectric ceramics ** |
|---|---|---|---|---|---|---|---|---|
| 82 | 263 | 9.3 | 12.7 | 55 | −128.6 | Yes | Red | D, CT, AL, NT, Co, Sp |
| 83 | 258 | 9.5 | 21.8 | 59.9 | −138.8 | Yes | Red | D, CT, AL, NT, CN, M |
| * 84 | 240 | 9.7 | 7.7 | −69.0 | 118.6 | Yes | Red | D, CT |
| 85 | 260 | 9.6 | 7.8 | −58.0 | 96.8 | Yes | Red | D, CT, AL |
| 86 | 280 | 9.2 | 13.2 | 59 | −136.4 | Yes | Red | D, CT, AL, NT |
| * 87 | Not evaluated due to not fired | — | — | — | — | Yes | Red | — |
| * 88 | 340 | 9 | 7.7 | −67.7 | 117.4 | No | White | D, AL |
| * 89 | 220 | 7 | 8.3 | 5.5 | −25 | Yes | Brown | CT, AL, Ce |
| * 90 | Not evaluated due to not fired | — | — | — | — | Yes | Red | — |
| * 91 | 310 | 9.4 | 24.8 | 99.9 | −218.6 | No | White | D, CT, AL |

Sample numbers marked with * are not within the scope of the present invention.
** D: Diopside, H: Hardystonite, Ce: Celsian, Co: Cordierite, G: Garnite, W: Willemite, Sp: Spinel, M: Mullit CT: $CaTiO_3$, ST: $SrTiO_3$, AL: $Al_2O_3$, CN: $Ca_2Nb_2O_7$, NT: $Nd_2Ti_2O_7$, A: Anorthite

TABLE 11

| No. | Bending strength MPa | Thermal expansion coefficient × $10^{-6}/°C$ | $\epsilon r$ | $\tau f \times 10^{-6}/°C$ | TCC × $10^{-6}/°C$ | Coloration or Prevention of discoloration | Color tone | Crystal phase in dielectric ceramics ** |
|---|---|---|---|---|---|---|---|---|
| 92 | 250 | 8.7 | 9.9 | 53.6 | −124.6 | Yes | Brown | D, ST, H, AL, W, G |
| 93 | 270 | 8.7 | 9.0 | 13.8 | −45 | Yes | Brown | D, ST, H, AL, W |
| 94 | 305 | 8.7 | 9.6 | 23.8 | −65 | Yes | Brown | D, ST, H, AL, W |
| 95 | 255 | 8.5 | 8.5 | −16.1 | 15.2 | Yes | Red | D, ST, H, AL, W |
| 96 | 250 | 8.7 | 11.9 | 55.0 | −127.4 | Yes | Brown | D, ST, H, AL, W, NT, Ce |
| 97 | 255 | 8.7 | 15.3 | 59.0 | −135.4 | Yes | Brown | D, ST, H, AL, W, NT, CN |
| 98 | 270 | 8.5 | 7.8 | −36.0 | 55 | Yes | Brown | D, H, AL, W |
| 99 | 312 | 9.4 | 9.5 | 53.6 | −126 | Yes | Brown | D, ST, AL, A |
| 100 | 305 | 9.5 | 9.2 | 53.6 | −126.2 | Yes | Brown | D, ST, AL |
| 101 | 305 | 9.7 | 9.0 | 59.9 | −139.2 | Yes | Brown | D, ST, AL |
| 102 | 305 | 9.4 | 9.7 | 23.8 | −66.4 | Yes | Brown | D, ST, AL |
| 103 | 302 | 9.4 | 8.9 | 33.7 | −86.2 | Yes | Brown | D, ST, AL |
| 104 | 255 | 9 | 8.7 | 33.7 | −85.4 | Yes | Red | D, ST, AL |
| 105 | 255 | 9.4 | 8.1 | 13.8 | −46.4 | Yes | Red | D, ST, AL |
| 106 | 350 | 9.4 | 8.4 | 13.8 | −46.4 | Yes | Red | D, ST, AL |
| 107 | 350 | 9 | 8.5 | 13.8 | −45.6 | Yes | Red | D, ST, AL |
| 108 | 350 | 9.3 | 8.8 | 23.8 | −66.2 | Yes | Red | D, ST, AL |
| 109 | 350 | 9.1 | 8.7 | 23.8 | −65.8 | Yes | Red | D, ST, AL |
| 110 | 290 | 9.4 | 12.3 | 55 | −128.8 | Yes | Red | D, CT, AL, NT, Co, Sp |
| 111 | 270 | 9.6 | 21.3 | 59.9 | −139 | Yes | Red | D, CT, AL, NT, CN, M |
| * 112 | 220 | 9.8 | 7.3 | 3.8 | −27.2 | Yes | Red | D, ST |
| 113 | 255 | 9.8 | 7.4 | −16.4 | 13.2 | Yes | Red | D, ST, AL |
| 114 | 255 | 9.3 | 12.8 | 59.0 | −136.6 | Yes | Red | D, ST, AL, NT |
| * 115 | Not evaluated due to not fired | — | — | — | — | Yes | — | — |
| * 116 | 295 | 9.6 | 24.3 | 99.9 | −219 | No | — | D, ST, AL |

Sample numbers marked with * are not within the scope of the present invention.
** D: Diopside, H: Hardystonite, Ce: Celsian, Co: Cordierite, G: Garnite, W: Willemite, Sp: Spinel, M: Mulli CT: $CaTiO_3$, ST: $SrTiO_3$, AL: $Al_2O_3$, CN: $Ca_2Nb_2O_7$, NT: $Nd_2Ti_2O_7$, A: Anorthite

TABLE 12

| No. | Bending strength MPa | Thermel expansion coefficient × $10^{-6}/°C$ | Characteristics at 9 to 15 GHz | | | Coloration or Prevention of discoloration | Color tone | Crystal phase in dielectric ceramics ** |
|---|---|---|---|---|---|---|---|---|
| | | | $\epsilon r$ | $\tau f \times 10^{-6}/°C$ | TCC × $10^{-6}/°C$ | | | |
| 117 | 282 | 9.2 | 8.8 | −19.9 | 21.4 | Yes | Red | D, CT, H, AL, ST |
| 118 | 290 | 9.3 | 8.8 | −29.9 | 41.2 | Yes | Red | D, CT, H, AL, ST |
| 119 | 277 | 9.4 | 8.7 | −39.9 | 61 | Yes | Red | D, CT, H, AL, ST |
| 120 | 260 | 9.5 | 14.8 | −50.0 | 81 | Yes | Red | D, CT, H, AL, ST, NT |
| 121 | 260 | 9.5 | 20.8 | −59.0 | 99 | Yes | Red | D, CT, H, AL, ST, NT |
| 122 | 309 | 9.3 | 9.1 | −16.5 | 14.4 | Yes | Red | D, CT, ST, AL |
| 123 | 268 | 8.5 | 8.9 | −16.9 | 16.8 | Yes | Brown | D, CT, ST, H, AL, W |
| 124 | 250 | 8.5 | 7.8 | −20.9 | 24.8 | Yes | Brown | D, CT, ST, H, AL, W |

** D: Diopside, H: Hardystonite, W: Willemite, CT: $CaTiO_3$, ST: $SrTiO_3$, AL: $Al_2O_3$, NT: $Nd_2Ti_2O_7$ As is apparent from the results of Tables 10 to 12, in the samples Nos. 62 to 69, 71 to 83, 85, 86, 92 to 97, 99 to 111, 113, 114 and 117 to 124 of the present invention wherein calcium titanate, strontium titanate or a mixture of calcium titanate and strontium titanate was used as the filler in the dielectric ceramic composition, any dielectric ceramic composition could be fired together with a low-resistance conductor such as Ag or Cu at a temperature within a range from 850 to 1050° C.

In spite of performing coloration, these samples had excellent dielectric characteristics as follows: the relative dielectric constant is 8 to 25, the three-point bending strength of the ceramics is 250 MPa or larger, the temperature coefficient of the resonant frequency is within a range of $0\pm60\times10^{-6}/°C$., and the temperature coefficient of the electrostatic capacity is within a range of $0\pm150\times10^{-6}/°C$.

On the other hand, in the samples Nos. 70, 84, 87 to 91, 98, 112, 115 and 116 which contain the diopside crystallized glass powder and filler component that is not within a scope of the present invention, the three-point bending strength was smaller than 250 MPa or the temperature coefficient τf of the resonant frequency was not within a range of $0\pm60\times 10^{-6}/°C$.

What is claimed is:

1. A dielectric ceramic obtained from a composition comprising:
   30 to 90% by weight of a glass powder capable of depositing a diopside crystal,
   1 to 40% by weight of a calcium titanate powder, a strontium titanate powder or a mixed powder the thereof having a mean particle size of 3 μm or smaller, and
   0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$, wherein said dielectric ceramic comprises a diopside crystal.

2. The dielectric ceramic according to claim 1, which is obtained from the composition comprising 30 to 90% by weight of a glass powder capable of depositing a diopside crystal, 1 to 40% by weight of a calcium titanate powder, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

3. The dielectric ceramic according to claim 1, which is obtained from the composition comprising 30 to 90% by weight of a glass powder capable of depositing a diopside crystal, 1 to 40% by weight of a strontium titanate powder, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

4. The dielectric ceramic composition according to claim 1, which is obtained from the composition comprising 30 to 90% by weight of a glass powder capable of depositing a diopside crystal, 1 to 40% by weight in total of a calcium titanate powder and a strontium titanate powder, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

5. The dielectric ceramic composition according to claim 1, wherein the glass powder capable of depositing a diopside crystal has a mean particle size of 3 μm or smaller.

6. The dielectric ceramic of claim 1 obtained by firing a preform of the composition at a temperature within a range from 850 to 1050° C.

7. The dielectric ceramics according to claim 6, wherein a relative dielectric constant (∈r) is 8 to 22, a three-point bending strength of the ceramics is 250 MPa or larger and a temperature coefficient of the resonant frequency is $0\pm60\times 10^{-6}/°C$.

8. A dielectric ceramic obtained from a composition comprising:
   100 parts by weight of a mixed powder comprising 30 to 90% by weight of a glass powder capable of depositing a diopside crystal, 1 to 40% by weight of a calcium titanate powder, a strontium titanate powder or a mixed powder thereof having a mean particle size of 3 μm or smaller, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$, and
   0.1 to 2.0 parts by weight of at least one kind of a powder selected from the group consisting of $Fe_2O_3$, $Cr_2O_3$, ZnO, CuO, $Ag_2O$, $Co_3O_4$, $MnO_2$, $CeO_2$ and $R_2O_3$ (R represents a rare earth element).

9. A dielectric ceramics of claim 8 obtained by firing a preform of a mixture comprising the composition at a temperature within a range from 850 to 1050° C.

10. The dielectric ceramics according to claim 9, wherein a relative dielectric constant (∈r) is 8 to 22, a three-point bending strength of the ceramics is 250 MPa or larger and a temperature coefficient of the resonant frequency is $0\pm60\times 10^{-6}/°C$.

11. A dielectric ceramic containing a diopside crystal phase that is obtained by firing a composition comprising, a glass powder capable of depositing a diopside crystal, and a calcium titanate powder, a strontium titanate powder or a mixed powder thereof, wherein a relative dielectric constant ($\epsilon r$) is 8 to 22, a three-point bending strength of the ceramics is 250 MPa or larger and a temperature coefficient of the resonant frequency is $0\pm60\times10^{-6}/°$ C.

12. The dielectric ceramic according to claim 11, wherein the temperature coefficient of the electrostatic capacity is $0\pm150\times10^{-6}/°$ C.

13. The dielectric ceramic according to claim 11, wherein at least diopside and/or a diopside solid solution and calcium titanate and/or strontium titanate co-exist as a crystal phase.

14. The dielectric ceramic according to claim 11, wherein the thermal expansion coefficient as measured at room temperature to 400° C. is $8\times10^{-6}/°$ C. or higher.

15. A dielectric ceramic obtained from a composition comprising:
   100 parts by weight of a mixed powder comprising 30 to 90% by weight of a glass powder capable of depositing a diopside crystal, 1 to 40% by weight of a calcium titanate powder, a strontium titanate powder or a mixed powder thereof, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$, and
   0.1 to 2.0 parts by weight of at least one kind of a powder selected from the group consisting of $Fe_2O_3$, $Cr_2O_3$, ZnO, CuO, $Ag_2O$, $Co_3O_4$, $MnO_2$, $CeO_2$ and $R_2O_3$ (R represents a rare earth element);
wherein the dielectric ceramic contains a diopside crystal and wherein a relative dielectric constant oft e dielectric ceramic ($\epsilon r$) is 8 to 22.

16. The dielectric ceramic of claim 15 obtained by firing a preform of a mixture comprising the composition at a temperature within a range from 850 to 1050° C.

17. The dielectric ceramic according to claim 16, wherein a relative dielectric constant ($\epsilon r$) is 8 to 22, a three-point bending strength of the ceramics is 250 MPa or larger and a temperature coefficient of the resonant frequency is $0\pm60\times10^{-6}/°$ C.

18. A dielectric ceramic obtained from a composition comprising:
   30 to 90% by weight of a glass powder capable of depositing a diopside crystal,
   1 to 40% by weight of a calcium titanate powder, a strontium titanate powder or a mixed powder thereof, and
   0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$,
wherein the dielectric ceramic contains a diopside crystal and wherein a relative dielectric constant of the dielectric ceramic ($\epsilon r$) is 8 to 22.

19. The dielectric ceramic according to claim 18, which is obtained from the composition comprising 30 to 90% by weight of a glass powder capable of depositing a diopside crystal, 1 to 40% by weight of a calcium titanate powder, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

20. The dielectric ceramic according to claim 18, which is obtained from the composition comprising 30 to 90% by weight of a glass powder capable of depositing a diopside crystal, 1 to 40% by weight of a strontium titanate powder, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

21. The dielectric ceramic according to claim 18, which is obtained from the composition comprising 30 to 90% by weight of a glass powder capable of depositing a diopside crystal, 1 to 40% by weight in total of a calcium titanate powder and a strontium titanate powder, and 0 to 60% by weight of at least one kind of a powder selected from the group consisting of $Al_2O_3$, $TiO_2$, $ZrO_2$, $MgTiO_3$, $BaTi_4O_9$, $La_2Ti_2O_7$, $Nd_2Ti_2O_7$, $Ca_2Nb_2O_7$, $SrZrO_3$ and $CaZrO_3$.

22. The dielectric ceramic composition according to claim 18, wherein the glass powder capable of depositing a diopside crystal, and the calcium titanate powder, the strontium titanate powder or the mixed powder thereof from which the ceramic is derived have a mean particle size of 3 $\mu m$ or smaller.

23. The dielectric ceramic of claim 18 obtained by firing a preform of the composition at a temperature within a range from 850 to 1050° C.

24. The dielectric ceramics according to claim 23, wherein a three-point bending strength of the ceramics is 250 MPa or larger and a temperature coefficient of the resonant frequency is $0\pm60\times^{-6}/°$ C.

* * * * *